United States Patent Office 2,726,012
Patented Dec. 6, 1955

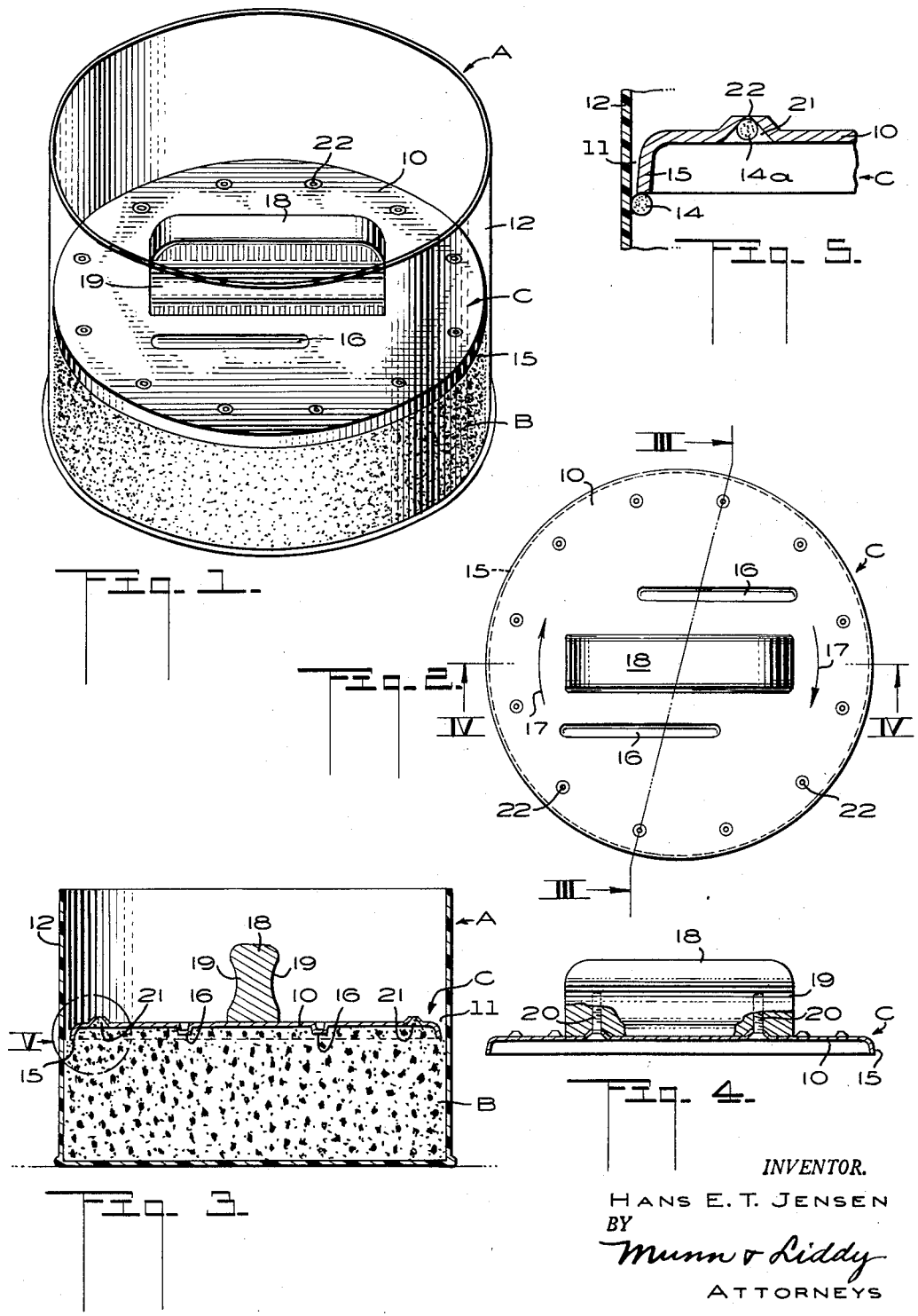

2,726,012

FLAVOR-PROTECTING COFFEE COVER

Hans E. T. Jensen, Los Angeles, Calif.

Application March 23, 1953, Serial No. 344,056

2 Claims. (Cl. 220—93)

The present invention relates to improvements in a flavor-protecting coffee cover; and it consists of the combinations, constructions, and arrangement of parts, as hereinafter described and claimed.

It is a well-known fact that vacuum-packed coffee will retain its original flavor, strength and other desirable characteristics over a long period of time. However, after its container has been opened, thereby exposing the contents to air, the coffee will rapidly dissipate much of its fine qualities, and even develop an objectionable stale taste, especially when the container is opened frequently.

Accordingly, a cardinal object of this invention is to provide a flavor-protecting cover, which is adapted to be removably inserted into a walled container for resting upon a loose body of coffee disposed therein. Such a container may be the one in which the coffee was packaged originally, or it may be a special container into which the coffee is transferred. In any event, this cover is fashioned in such a manner as to displace air from the body of coffee when the cover is inserted into the container and pressed downwardly upon the coffee.

Moreover, it is proposed herein to provide a cover of the character described, which will permit air to readily escape upwardly from beneath the cover as the latter is pressed downwardly in the container; and to allow air to reenter the space below the cover upon raising the cover to permit access to the coffee. These steps are accomplished without requiring the use of valves, which would become clogged by the grains of coffee.

Another object is to provide a flavor-protecting cover that is fashioned in such a manner as to remove air voids or pockets from the body of coffee, when the cover is pressed against the coffee and rotated relative to the container.

As a still further object, it is proposed to provide a device of the type set forth, which is simple in construction, durable and efficient for the purpose intended, and which may be manufactured at a relatively low cost.

Other objects and advantages will appear as the specification proceeds. The novel features will be pointed out in the appended claims.

*Drawings*

For a better understanding of this invention, reference should be had to the accompanying drawing, forming part hereof, in which:

Figure 1 is a perspective view of a transparent container having my flavor-protecting cover inserted thereinto so as to rest on a body of coffee disposed therein;

Figure 2 is a top plan view of the cover by itself;

Figure 3 is a vertical sectional view taken along the transverse plane III—III of the cover in Figure 2, and adding the container thereto;

Figure 4 is a vertical sectional view taken along the line IV—IV of Figure 2, a portion being shown in elevation; and Figure 5 is an enlarged sectional view of the portions of the container and cover enclosed by the dot-dash circle V in Figure 3.

While I have shown only the preferred form of my invention, it should be understood that various changes, or modifications, may be made within the scope of the annexed claims, without departing from the scope thereof.

*Detailed description*

Referring to the drawing in detail, there has been disclosed a container indicated generally at A, which is partially filled for the purpose of illustration with a body of coffee B. This container may be made from transparent material, as in Figure 1, in order to readily disclose its contents, or it may be the usual metal can in which vacuum-packed coffee is packaged and sold. In the latter event, the regular cover for the can has been removed.

It will be noted that my improved flavor-protecting coffee cover has been designated at C, and is adapted to be removably inserted into the container A for resting on the body of coffee B to provide a seal thereover to thus preclude air from gaining access to the coffee, excepting during periods when this cover is removed to allow a quantity of coffee to be withdrawn.

In its structural features, the cover C defines a disc 10 having a marginal rim slightly smaller than the internal diameter of the container A so as to be freely movable up and down in the latter. This will provide an annular space 11 between the rim of the disc and the upright wall 12 of the container for upward escapement of air from beneath the disc as it is pressed toward the coffee. Also, this space will afford downward entry of air to a position below the disc upon raising the latter. However, this space is sufficiently small for effectively sealing by the grains 14 of coffee (see Figure 5) when the disc is pressed downwardly upon the body of coffee.

As a further feature, a marginal flange 15 depends from the disc 10 and extends circumferentially around the rim of the disc so as to become embedded in the body of coffee, when the disc is pressed upon the latter, to thereby provide an effective seal for precluding entrance of air into the coffee. This flange flares downwardly and outwardly towards the wall 12 of the container to thereby press the coffee towards the center of the container when the disc is forced against the coffee. Moreover, this marginal flange reinforces the disc.

For the purpose of excluding air from the coffee, and thus protect the flavor of the latter, all air voids or pockets should be removed from the body of stored coffee. This is accomplished by fashioning one or more non-radial ribs 16 on the underneath surface of the disc 10. These ribs project into the coffee B to smooth the general upper surface of the latter, when the disc is pressed downwardly upon the coffee and rotated relative to the container. When the disc is turned in the direction of the arrows 17 in Figure 2, the top portion of the coffee will be diverted towards the center of the container, filling up any air pockets. Of course, the ribs will reinforce the disc.

In order to raise, lower and rotate the disc 10, an operating handle 18 has been provided on the upper surface of the disc. This handle may have a general rectangular outline to permit ready gripping thereof, and grooved at 19—19 on its opposing sides to facilitate its grasping (see Figure 3). For securing this handle to the disc, a pair of countersunk screws 20—20 have been inserted upwardly through the disc so as to be threaded into the handle (see Figure 4).

As clearly illustrated in the drawings, a series of upwardly-tapering walled recesses 21 communicate with the underneath surface of the disc 10 and have open bases into which coffee grains 14a (see Figure 5) may be crowded, when the disc is pressed downwardly upon the body of coffee. The top wall of each of these recesses has a relatively small aperture 22 therein through which air may flow when the disc is moved upwardly and downwardly relative to the container A. These apertures are sufficiently small as to be automatically sealed by the grains 14a of coffee, when the disc 10 is pressed downwardly against the body of coffee. During upward movement of the disc, these coffee grains will drop out of the recesses 21, and is aided by the flare of the recesses in a downward direction. These recesses may be conical, or have other upwardly-tapering shapes, and are provided in a series disposed around the circumference of the disc.

The cover C is rigid so as to force air out of the coffee when applied. It may be made from stainless steel, or other suitable material. A flexible cover would not press air from pockets in the body of coffee. Although coffee cans are not always perfectly round, my cover C may be inserted thereinto, without binding, due to spacing of the rim of the disc from the wall of the container.

Summary

Having thus described the various structural features of my flavor-protecting cover C, the use thereof is summarized briefly as follows:

Assuming that a body of coffee B is disposed in the container A, the handle 18 is grasped by an individual, and the cover C inserted into the container so as to rest upon the top of the coffee. Air disposed in the container will escape upwardly through the annular space 11 and the series of apertures 22 during the lowering of the cover.

As the cover is pressed into the coffee, it is rotated relative to the container so that the ribs 16 will smooth out the upper part of the coffee and remove all air pockets therefrom. The grains 14 of coffee will provide a seal over the annular space 11, when the flange 15 is forced into the coffee (see Figure 5). Likewise, coffee grains 14a will be forced upwardly into the recesses 21 to seal the apertures 22. Thus the coffee is sealed against entrance of air thereinto.

When a person desires to obtain a portion of coffee from the container, the cover C may be readily withdrawn. During the upward movement of the container, the grains 14a of coffee will gravitate from the recesses 21, thus allowing air to enter into a position below the disc 10. Also, air will enter through the annular space 11 to overcome any tendency for a vacuum to form below the cover as it is removed.

I claim:

1. In a flavor-protecting coffee cover: a rigid disc defining an underneath surface adapted for resting upon a loose body of coffee grains; the disc having a marginal rim provided with a downwardly-projecting flange extending circumferentially therearound so as to become embedded in the coffee grains, when the disc is pressed against the latter; the disc having a plurality of upwardly converging recesses; the larger open ends of the recesses communicating with the underneath surface of the disc so that coffee grains will be crowded into the recesses from below, when the disc is pressed downwardly upon the body of coffee grains; the disc having a relatively small air-passageway aperture at the top of each recess; the apertures being sufficiently small as to be sealed by the coffee grains crowded thereinto; the walls defining the recesses diverging downwardly to such an extent that the coffee grains will drop out of the recesses, when the disc is elevated; and an operating handle secured to an upper surface of the disc.

2. In a flavor-protecting coffee cover: a rigid disc defining an underneath surface adapted for resting upon a loose body of coffee grains; the disc having a marginal rim provided with a downwardly-projecting flange extending circumferentially therearound so as to become embedded in the coffee grains, when the disc is pressed against the latter; the disc having a plurality of upwardly-converging recesses; the larger open ends of the recesses communicating with the underneath surface of the disc so that coffee grains will be crowded into the recesses from below, when the disc is pressed downwardly upon the body of coffee grains; the disc having a relatively small air-passageway aperture at the top of each recess; the apertures being sufficiently small as to be sealed by the coffee grains crowded thereinto; the walls defining the recesses diverging downwardly to such an extent that the coffee grains will drop out of the recesses, when the disc is elevated; and an operating handle secured to an upper surface of the disc; the disc having at least one rigid rib projecting downwardly from the underneath surface thereof, and positioned to project into the body of the coffee grains, when the disc is pressed against the latter; this rib being imperforate, and disposed non-radially of the disc; the rib being located to divert the coffee grains towards the center of the disc, upon rotating the disc in a predetermined direction, to thereby smooth out the general top surface of the body of coffee grains and remove air pockets therefrom.

References Cited in the file of this patent
UNITED STATES PATENTS

| | | |
|---|---|---|
| 725,149 | Saenger | Apr. 14, 1903 |
| 968,752 | Ellis | Aug. 30, 1910 |
| 983,437 | Gray | Feb. 7, 1911 |
| 1,818,924 | Basmadjian | Aug. 11, 1931 |
| 2,096,358 | Gautier | Oct. 19, 1937 |
| 2,190,203 | Barnard | Feb. 13, 1940 |